United States Patent
Rich et al.

(10) Patent No.: US 10,228,447 B2
(45) Date of Patent: Mar. 12, 2019

(54) INTEGRATED APPARATUS AND METHOD TO COMBINE A WIRELESS FENCE COLLAR WITH GPS TRACKING CAPABILITY

(71) Applicant: RADIO SYSTEMS CORPORATION, Knoxville, TN (US)

(72) Inventors: Christopher Rich, Leola, PA (US); Andrew Beck, Ringoes, NJ (US); Gary Roulston, Lititz, PA (US); Andrew Angellotti, West Lafayette, IN (US)

(73) Assignee: Radio Systems Corporation, Knoxville, TN (US)

( * ) Notice: Subject to any disclaimer, the term of this patent is extended or adjusted under 35 U.S.C. 154(b) by 354 days.

(21) Appl. No.: 14/200,362

(22) Filed: Mar. 7, 2014

(65) Prior Publication Data

US 2014/0261235 A1    Sep. 18, 2014

Related U.S. Application Data

(60) Provisional application No. 61/788,559, filed on Mar. 15, 2013.

(51) Int. Cl.
*A01K 15/02* (2006.01)
*G01S 19/29* (2010.01)
(Continued)

(52) U.S. Cl.
CPC .............. *G01S 5/14* (2013.01); *A01K 11/008* (2013.01); *A01K 15/023* (2013.01);
(Continued)

(58) Field of Classification Search
CPC .. A01K 11/008; A01K 15/023; A01K 27/009; G01S 5/0242; G01S 5/0252; G01S 5/0294
(Continued)

(56) References Cited

U.S. PATENT DOCUMENTS 5,933,079 A    8/1999  Frink
6,067,018 A *  5/2000  Skelton ................ A01K 11/008
                                                    119/721
(Continued)

FOREIGN PATENT DOCUMENTS

CN        101112181       1/2008
WO     WO 2008/085812     7/2008
(Continued)

*Primary Examiner* — Kathleen I Alker
*Assistant Examiner* — Danielle A Clerkley
(74) *Attorney, Agent, or Firm* — Baker, Donelson, Bearman, Caldwell & Berkowitz PC

(57) ABSTRACT

An integrated apparatus and method is provided for a collar that is configured to operate as part of a wireless fence system that contains and monitors the location of a dog within a containment area defined by the wireless fence system and further configured to provide GPS tracking capability when the dog has escaped from the containment area. As long as the dog remains in the area defined by the wireless fence, the collar operates solely in a wireless fence mode, communicating with the transmitters used as part of the wireless fence system. The GPS tracking function remains "asleep" and is not activated unless and until the dog escapes. Once GPS mode is activated, fence mode is shut down and operation of the GPS enables the dog owner or other individual to receive SMS messages and/or email with information on the dog's location on a smart-phone, tablet or PC.

21 Claims, 8 Drawing Sheets

(51) Int. Cl.
  *G01S 5/14* (2006.01)
  *G01S 19/14* (2010.01)
  *A01K 27/00* (2006.01)
  *A01K 11/00* (2006.01)
  *G01S 19/16* (2010.01)
  *G08B 21/02* (2006.01)
  *G01S 19/34* (2010.01)
  *G01S 5/02* (2010.01)

(52) U.S. Cl.
  CPC ............ *A01K 27/009* (2013.01); *G01S 19/14* (2013.01); *G01S 19/16* (2013.01); *G01S 19/34* (2013.01); *G08B 21/0261* (2013.01); *G08B 21/0269* (2013.01); *G01S 5/02* (2013.01)

(58) Field of Classification Search
  USPC .................. 119/712, 714, 720, 721; 256/10; 340/686.1, 686.6, 712, 714, 720, 721
  See application file for complete search history.

(56) References Cited

U.S. PATENT DOCUMENTS

| | | | |
|---|---|---|---|
| 6,232,880 B1* | 5/2001 | Anderson | A01K 15/023 119/421 |
| 6,404,338 B1 | 6/2002 | Koslar | |
| 6,441,778 B1* | 8/2002 | Durst | G01S 5/0027 119/720 |
| 6,903,682 B1* | 6/2005 | Maddox | A01K 15/023 342/357.55 |
| 7,173,535 B2 | 2/2007 | Bach et al. | |
| 7,259,718 B2 | 8/2007 | Patterson et al. | |
| 7,477,155 B2 | 1/2009 | Bach et al. | |
| 2002/0010390 A1 | 1/2002 | Guice et al. | |
| 2002/0015094 A1 | 2/2002 | Kuwano et al. | |
| 2002/0036569 A1 | 3/2002 | Martin | |
| 2002/0092481 A1 | 7/2002 | Spooner | |
| 2002/0196151 A1 | 12/2002 | Troxler | |
| 2003/0035051 A1 | 2/2003 | Cho et al. | |
| 2003/0116099 A1 | 6/2003 | Kim et al. | |
| 2003/0169207 A1 | 9/2003 | Beigel et al. | |
| 2003/0179140 A1 | 9/2003 | Patterson et al. | |
| 2003/0218539 A1 | 11/2003 | Hight | |
| 2004/0108939 A1 | 6/2004 | Giunta | |
| 2004/0162875 A1 | 8/2004 | Brown | |
| 2005/0000469 A1 | 1/2005 | Giunta et al. | |
| 2005/0007251 A1 | 1/2005 | Crabtree et al. | |
| 2005/0020279 A1 | 1/2005 | Markhovsky et al. | |
| 2005/0035865 A1 | 2/2005 | Brennan et al. | |
| 2005/0059909 A1 | 3/2005 | Burgess | |
| 2005/0066912 A1 | 3/2005 | Korbitz et al. | |
| 2005/0081797 A1 | 4/2005 | Laitinen et al. | |
| 2005/0145196 A1 | 7/2005 | Crist et al. | |
| 2005/0145200 A1 | 7/2005 | Napolez et al. | |
| 2005/0172912 A1 | 8/2005 | Crist et al. | |
| 2005/0217606 A1 | 10/2005 | Lee et al. | |
| 2005/0235924 A1 | 10/2005 | Lee et al. | |
| 2005/0263106 A1 | 12/2005 | Steinbacher | |
| 2005/0280546 A1 | 12/2005 | Ganley et al. | |
| 2005/0288007 A1 | 12/2005 | Benco et al. | |
| 2006/0000015 A1 | 1/2006 | Duncan | |
| 2006/0011145 A1 | 1/2006 | Kates | |
| 2006/0027185 A1 | 2/2006 | Troxler et al. | |
| 2006/0092676 A1 | 5/2006 | Liptak et al. | |
| 2006/0102101 A1 | 5/2006 | Kim | |
| 2006/0112901 A1 | 6/2006 | Gomez | |
| 2006/0191491 A1 | 8/2006 | Nottingham et al. | |
| 2006/0196445 A1 | 9/2006 | Kates | |
| 2006/0197672 A1* | 9/2006 | Talamas, Jr. | A01K 15/023 340/573.3 |
| 2006/0202818 A1* | 9/2006 | Greenberg | A01K 15/023 340/539.13 |
| 2007/0011339 A1 | 1/2007 | Brown | |
| 2007/0103296 A1 | 5/2007 | Paessel et al. | |
| 2007/0204803 A1 | 9/2007 | Ramsay | |
| 2007/0204804 A1 | 9/2007 | Swanson et al. | |
| 2007/0249470 A1 | 10/2007 | Niva et al. | |
| 2007/0266959 A1 | 11/2007 | Brooks | |
| 2008/0004539 A1 | 1/2008 | Ross | |
| 2008/0036610 A1 | 2/2008 | Hokuf et al. | |
| 2008/0055154 A1 | 3/2008 | Martucci et al. | |
| 2008/0055155 A1 | 3/2008 | Hensley et al. | |
| 2008/0058670 A1 | 3/2008 | Mainini | |
| 2008/0061978 A1 | 3/2008 | Huang | |
| 2008/0061990 A1* | 3/2008 | Milnes | A01K 15/023 340/573.1 |
| 2008/0119757 A1 | 5/2008 | Winter | |
| 2008/0129457 A1 | 6/2008 | Ritter et al. | |
| 2008/0141949 A1 | 6/2008 | Taylor | |
| 2008/0143516 A1 | 6/2008 | Mock et al. | |
| 2008/0156277 A1 | 7/2008 | Mainini et al. | |
| 2008/0163827 A1 | 7/2008 | Goetzl | |
| 2008/0186167 A1 | 8/2008 | Ramachandra | |
| 2008/0186197 A1 | 8/2008 | Rochelle et al. | |
| 2008/0236514 A1 | 10/2008 | Johnson et al. | |
| 2008/0252527 A1 | 10/2008 | Garcia | |
| 2008/0272908 A1 | 11/2008 | Boyd | |
| 2009/0000566 A1 | 1/2009 | Kim | |
| 2009/0002188 A1 | 1/2009 | Greenberg | |
| 2009/0020002 A1 | 1/2009 | Williams et al. | |
| 2009/0025651 A1 | 1/2009 | Lalor | |
| 2009/0031966 A1 | 2/2009 | Kates | |
| 2009/0102668 A1 | 4/2009 | Thompson et al. | |
| 2009/0224909 A1 | 9/2009 | Derrick et al. | |
| 2009/0289785 A1 | 11/2009 | Leonard | |
| 2009/0289844 A1 | 11/2009 | Palsgrove et al. | |
| 2010/0033339 A1 | 2/2010 | Gurley et al. | |
| 2010/0107985 A1 | 5/2010 | O'Hare | |
| 2010/0139576 A1 | 6/2010 | Kim et al. | |
| 2010/0154721 A1 | 6/2010 | Gerig et al. | |
| 2010/0231391 A1 | 9/2010 | Dror et al. | |
| 2010/0238022 A1 | 9/2010 | Au et al. | |
| 2010/0315241 A1 | 12/2010 | Jow | |
| 2011/0140967 A1* | 6/2011 | Lopez Pou | A01K 11/008 342/450 |
| 2012/0000431 A1 | 1/2012 | Khoshkish | |
| 2012/0037088 A1* | 2/2012 | Altenhofen | A01K 11/008 119/720 |
| 2015/0172872 A1* | 6/2015 | Alsehly | G01S 5/0236 455/457 |

FOREIGN PATENT DOCUMENTS

| | | |
|---|---|---|
| WO | WO 2009/105243 | 8/2009 |
| WO | WO 2009/106896 | 9/2009 |
| WO | WO 2012/122607 | 9/2012 |

* cited by examiner

INTEGRATED APPARATUS AND METHOD TO COMBINE A WIRELESS FENCE COLLAR WITH GPS TRACKING CAPABILITY

This application is based upon provisional application, U.S. Ser. No. 61/788,559, filed Mar. 15, 2013, and hereby claims the priority thereof to which this application is entitled.

BACKGROUND OF THE INVENTION

Field of the Invention

The present invention is related to the field of animal control and containment and, more particularly, to a dog collar that is configured to both operate with a wireless fence system to contain a dog and provide GPS tracking capability when the dog has escaped from the area defined by the wireless fence system.

Description of the Related Art

GPS tracking systems are used in connection with a variety of equipment including telephones, motor vehicles, wireless radio systems, etc. Dog collars that emit an RF signal are also available and are used with a handheld device that tracks the location of the dog that is wearing the collar using GPS coordinates. However, these wireless fence systems and GPS tracking devices operate as separate systems and are not integrated as they serve different purposes.

Hence, there is a need for an integrated apparatus and method which incorporates GPS tracking capability within a collar that is configured to operate as part of a wireless fence system for the containment and tracking of an animal wearing the collar, such as a dog and the like.

SUMMARY OF THE INVENTION

In view of the foregoing, the present invention is directed to a collar configured to operate within a wireless fence system to contain a dog and further configured, to provide. GPS tracking capability when the dog has escaped from the area defined by the wireless fence system. As long as the dog remains in the area defined by the wireless fence, the collar operates solely in cooperation with the wireless transmitters used as part of the wireless fence system. The GPS tracking function remains "asleep" and is not activated unless and until the dog escapes. Once activated, operation of the GPS enables the dog owner or other individual to locate the dog with a GPS receiver that is configured for communication with the collar.

Accordingly, it is an object of the present invention to provide an integrated apparatus and method of operation for a dog collar, that provides the user with both a containment function and a GPS locating function.

Another object of the present invention is to provide an integrated apparatus and method of operation for a dog collar in accordance with the preceding object that includes two separate printed circuit boards (PCBs), one for operation with a wireless fence system and the other for GPO operation.

A further object of the present invention is to provide an integrated apparatus and method of operation for a dog collar in accordance with the preceding objects in which each PCB is powered by its own battery so that the collar includes one battery utilized exclusively for fence operation and a second battery that is held in reserve for the GPS operation.

A still further object of the present invention is to provide an integrated apparatus and method of operation for a dog collar in accordance with the preceding objects in which the collar's wireless fence containment function is shut down when GPS operation is powered up.

Yet another object of the present invention is to provide an integrated apparatus and method of operation for a dog collar in accordance with the preceding objects that uses cell, phone technology in conjunction with the GPO to track the dog's location and send SMS messages and/or email with information on the dog's location to a user's smart tablet, PC or other suitable device.

Still another object of the present invention is to provide an integrated apparatus and method of operation for a dog collar in accordance with the preceding objects that uses a mapping service to display the dog's location.

It is yet another object of the invention to provide an integrated apparatus and method of operation for a dog collar that is not complex in structure and which can be manufactured at low cost but yet efficiently combines both fence containment and GPS tracking capabilities.

These together with other objects and advantages which will become subsequently apparent reside in the details of construction and operation as more fully hereinafter described and claimed, reference being had to the accompanying drawings forming part hereof, wherein like numerals refer to like parts throughout.

DETAILED DESCRIPTION OF THE PREFERRED EMBODIMENTS

Figure 1:
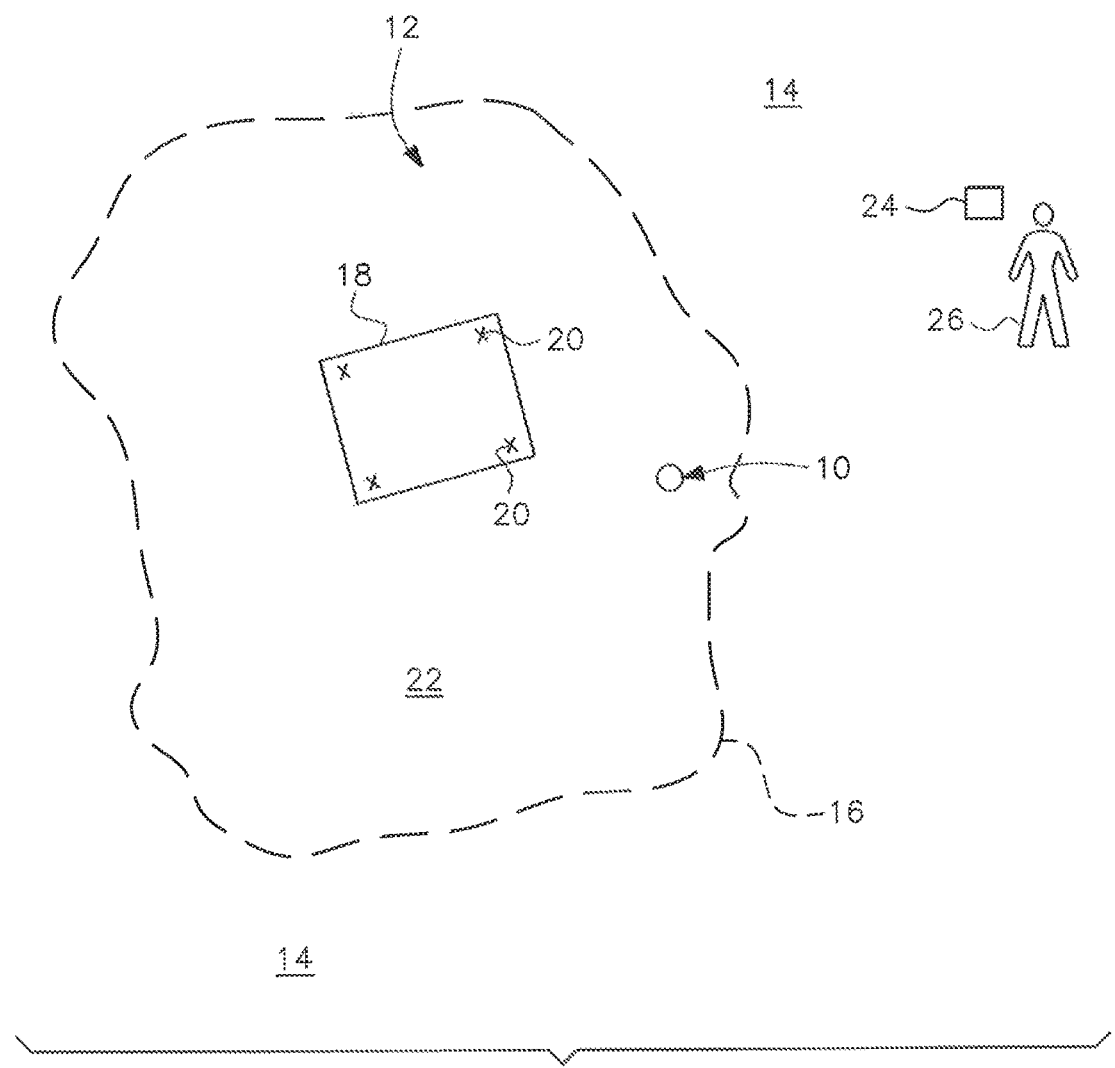
FIG. 1 shows a house with multiple transmitter units that are used to track the location of a dog within a wireless fence system and the surrounding GPS zone.

Although only one preferred embodiment of the invention is explained in detail, it is to be understood that the embodiment is given by way of illustration only. It is not intended that the invention be limited in its scope to the details of construction and arrangement or components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIG. 1, the present invention is directed to a collar generally designated by reference numeral 10 that is operative within a wireless fence system, generally designated by reference numeral 12. The wireless fence system 12 is surrounded by the GPS zone. The GPS zone represents virtually the entire geographic area outside the containment area 22 defined by the fence 16 of the wireless fence system 12.

The wireless fence system includes at least one transmitter 20, and preferably a plurality of transmitters 20, positioned within a house 18 or other building which serves as a base. The transmitters 20 track the location of the collar (and the dog wearing the collar) within the containment area 22. In the embodiment shown, four transmitters are used. A full description of a wireless fence system compatible with the present invention is set forth in U.S. Publ. No. 2011/0298615 ("the '615 publication"), the subject matter of which is hereby incorporated by reference as if set forth herein in its entirety.

The '615 publication, as incorporated by reference herein, also provides a description of a collar that could be modified to include the UPS capability of the instant invention.

Figure 2:
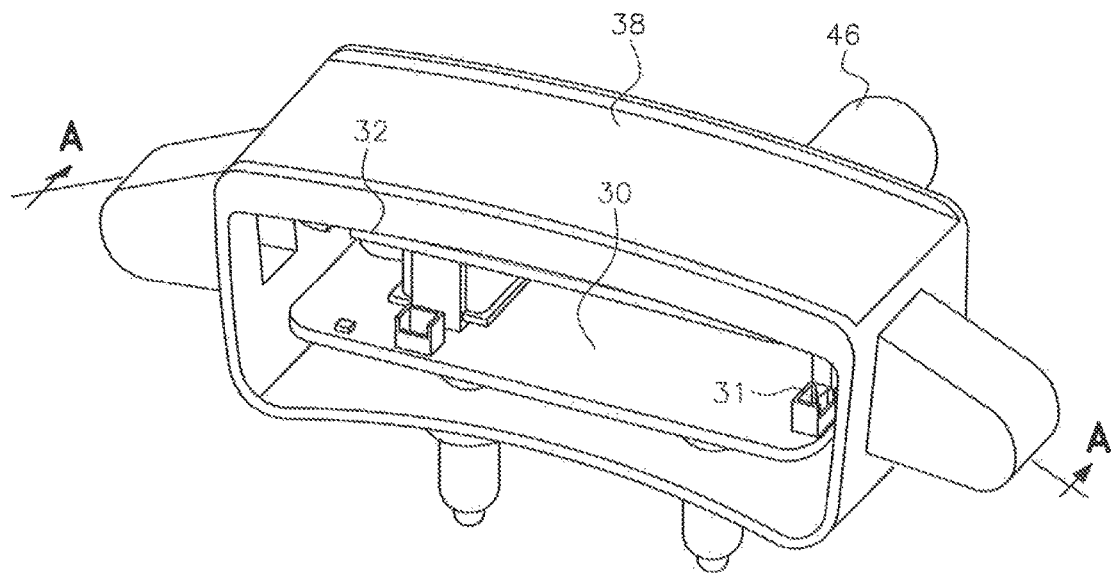
FIG. 2 is a cutaway perspective view of the control unit with two PCBs in accordance with the present invention.
Figure 3:
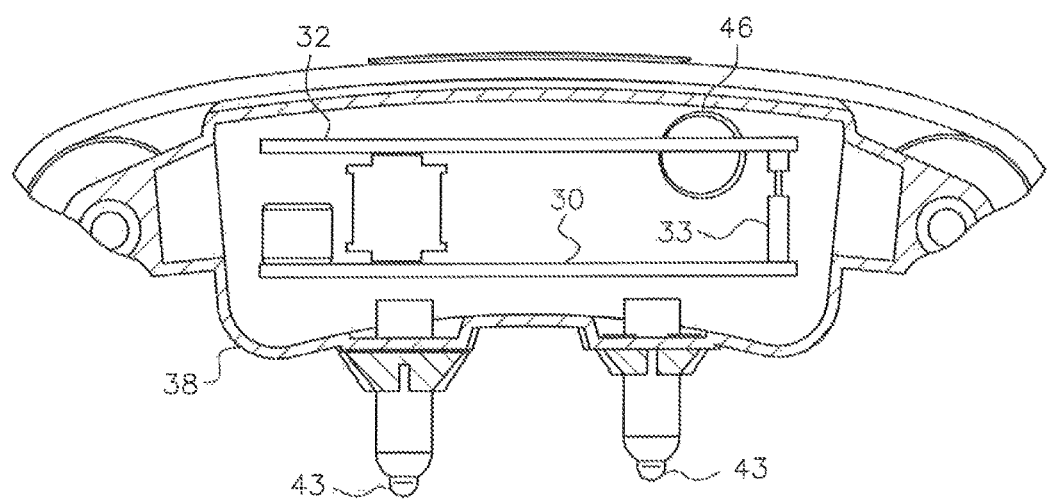
FIG. 3 is a sectional view taken along line A-A of FIG. 2.
Figure 10:
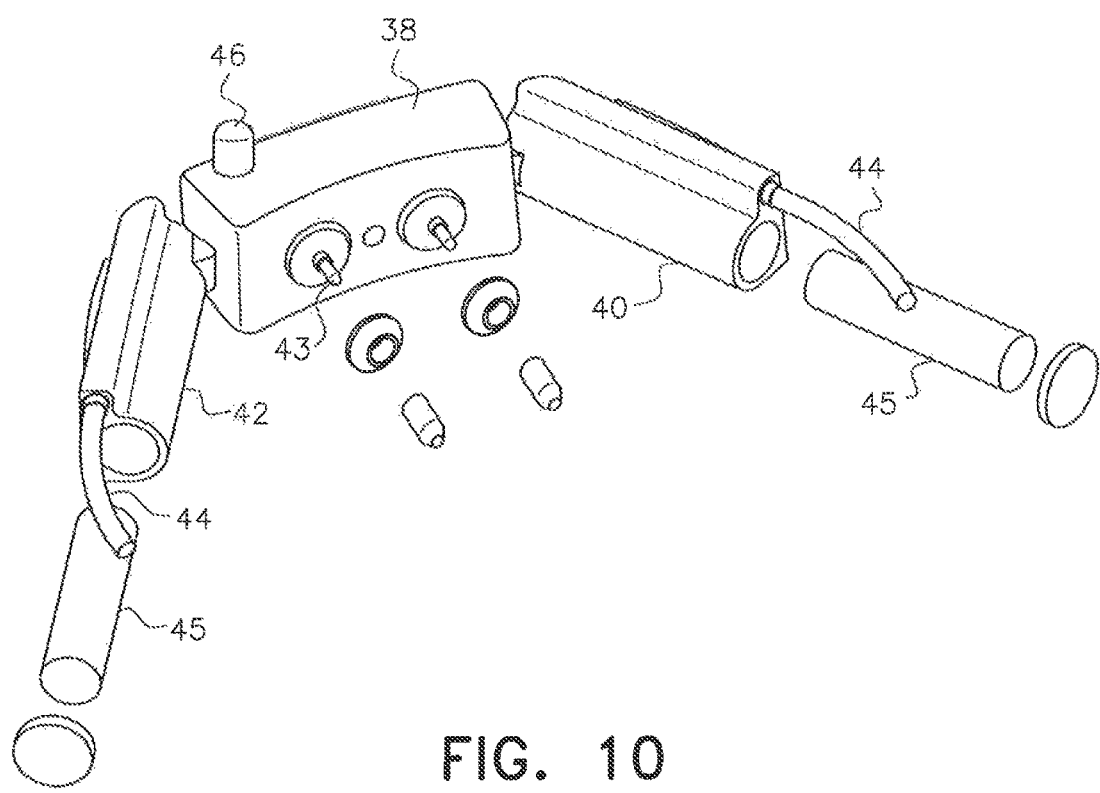
FIG. 10 is an exploded perspective view of the collar components from the angle shown in FIG. 9A.

In addition to the features set forth in the collar described in the '615 publication, the collar according to the present invention includes two separate printed circuit boards (PCBs) as shown in FIGS. 2 and 3. Each PCB is powered by its own battery 45 so that the collar includes one battery utilized exclusively for fence operation, i.e., "fence mode", and a second battery that is held in reserve for the GPS operation, i.e., "GPS mode" (see FIG. 10). The printed circuit boards include a fence mode PCB 30 for operation with the wireless fence system 12 and a GPS mode PCB 32 for GPS tracking operation in the GPS zone 14. A power connector 31 is located on the fence mode PCB 30. The fence mode PCB 30 and the GPS mode PCB 32 are operatively connected to one another with an inter-PCB connector 33.

The collar operates in fence mode as long as the dog remains within the containment area 22. As discussed herein, "fence mode PCB" and "fence module" are often used interchangeably. However, the fence module technically includes the fence mode PCB 30, antennas 44, a battery pack 40 or 42 with battery power source 45, and collar electrodes 43 (see FIGS. 7-10).

Figure 4:
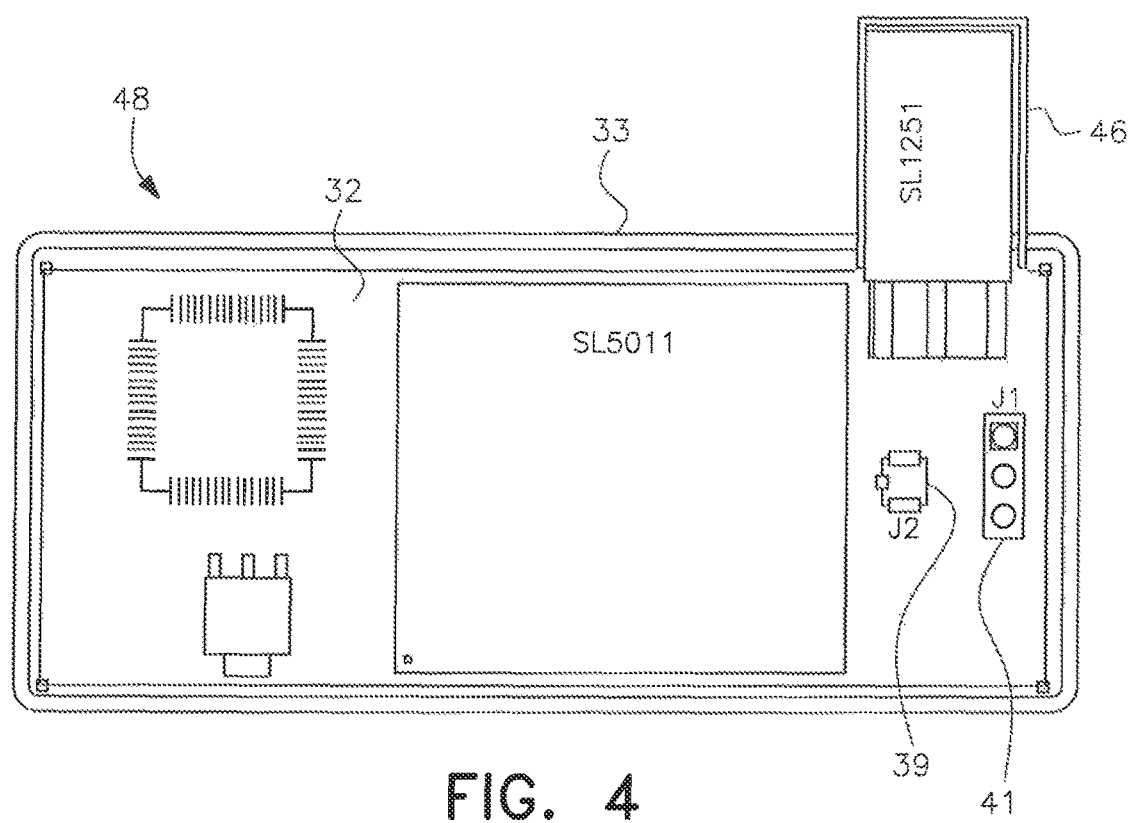
FIG. 4 shows the GPS module in accordance with the present invention.

Should the dog escape the area 22, the fence mode PCB 30 powers up the GPS mode PCB 32 for GPS mode operation as will be discussed more fully hereinafter. The GPS mode BOB 32 is part of a CBS module generally designated by reference numeral 48 that includes the PCB 32 and an external antenna 46, as shown in FIG. 4. The GPS module 48 also includes a battery pack 40 or 42 with battery power source 45. In the embodiment shown, the PCB 32 utilizes a wireless radio with an integral GPS receiver (not shown). Mounting of the antenna 46 external to the enclosure 33 containing the PCB 32 ensures good communication capability and also provides adequate distance between the PCB and the antenna to avoid interference.

Figure 5:
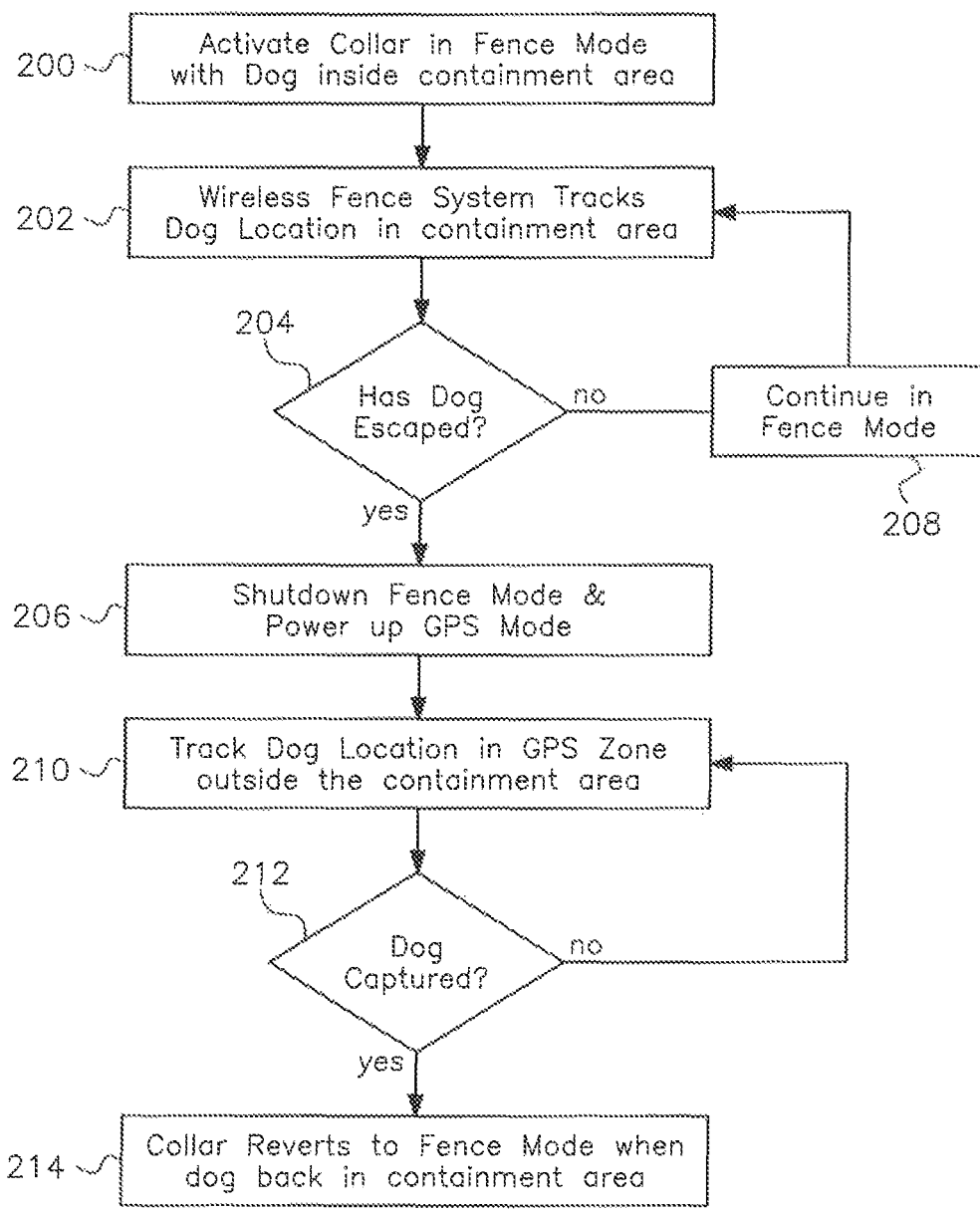
FIG. 5 is a flow chart of the operation of an integrated apparatus and method of operation for a collar that has both wireless fence containment and GPS location modes in accordance with the present invention.

As shown in the flowchart of FIG. 5, the collar is first activated by the user in fence mode and used to contain the dog within the containment area 22 defined by the fence 16, step 200. When the fence module 30 is active and the collar is operating in fence mode, the GPS module 48 is inactive and the transmitters of the wireless fence system operate with the collar to track the dog's location within the containment area 22, step 202. As long as the dog remains within the containment area 22, i.e., has not escaped, step 204, the collar continues to operate in fence mode, step 208. If the dog escapes the containment area, step 204, the GPS module is powered up, step 106, and the fence module shuts down.

Once the GPS module has been powered up, step 206, the user tracks the dog/collar in the GPS zone outside the containment area, step 210. As long as the dog is loose and has not been caught, step 212, the collar remains in GPS mode to track the dog's location, step 210. Once the dog is caught and returned to the containment area, the collar reactivates the fence module and reverts to fence mode operation, step 214.

When in GPS mode, the GPS module 48 in the dog collar uses cell phone technology in conjunction with the GPS to track the dog's location and display it in nearly real time on a smart device 24 such as a computer, tablet, cell phone, etc. that is used by the user 26 to see the dog's location as determined using GPS coordinates as is known to those skilled in the art. The cell phone technology may be CDMA, GSM or the like. Display of the dog's location may be effected using a commercial mapping service such as a version of Google Maps or similar mapping application known to those skilled in the art.

The collar is configured to activate the GPS module and switch from fence mode operation to GPS mode operation under certain circumstances, one of which is a boundary breach. According to one embodiment, a "breach" signal is generated when the dog goes outside of or breaches the fence boundary. The breach signal initiates a timer in the fence operation firmware that defines a boundary breach timeout. The boundary breach timeout can be set for any desired time period, such as 30 seconds, for example. During the timeout period, the collar first administers an audible signal that lasts from between about two and six seconds, and preferably between about two and three seconds, followed a series of repetitive pulse correction signals delivered by the collar electrodes 43. These signals are intended to cause the dog to return to the containment area. The signal sequence may be repeated one or more times until the timeout timer expires.

If the dog returns to the containment area 22 before the boundary breach timeout expires, the collar resets and resumes normal wireless fence mode operation using the fence module. If the dog does not return to the containment area before the timeout expires, however, expiration of the timeout causes the fence mode PCB 30 to wake up the GPO mode PCB 32 in the GPS module, activating the GPS circuitry to begin tracking the dog's location. The collar will not reset to fence mode operation until after the dog has returned to the containment area.

When the GPS module has determined that the position of the dog is at or beyond a set distance from the containment area, the GPS mode PCB sends a "sleep request" signal to the fence mode PCB. The fence mode PCB, if no longer in communication with the transmitters of the wireless fence system, will act on the "sleep request" signal and enter a deep sleep state to conserve battery power. The collar's operation in wireless fence mode is thus suspended while the collar operates in GPS mode. A similar battery-conserving sleep state may be initiated when the dog is inactive in order to conserve battery power; in deep sleep mode, the microprocessor is still powered on, but at a very low level.

GPS tracking mode operation will continue as long as the dog remains outside of the containment area 22. If/when the dog's location is determined by the GPS module to be within a set distance from the containment area, the GPO mode PCB 32 will deactivate the "sleep request" signal. Upon deactivation of the "sleep request" signal, the fence mode PCB 30 wakes up and attempts to reestablish communications with the transmitters of the wireless fence system. The GPS module continues operating in GPS mode until the dog has returned to a location inside the containment area, as determined by the fence mode PCB through the reestablishment of communication with the transmitters of the wireless fence system. Once the dog's location within the containment area has been identified by the fence module, the fence mode PCB 30 shuts down the UPS module and resumes normal wireless fence mode operation. Hence, the GPS module 48 is not active when the dog is inside the fence boundary.

In addition to activation upon boundary breach, the GPS module is also activated when the collar fails to receive a specified number of "polling" packets from the base transmitter of the wireless fence system, or fails to receive a polling packet for a predetermined time period, indicating a loss of communication with the base. When activated as a result of communication loss, the GPS module operates in a manner that is functionally equivalent to that induced by a boundary breach timeout as described above.

Figure 6:
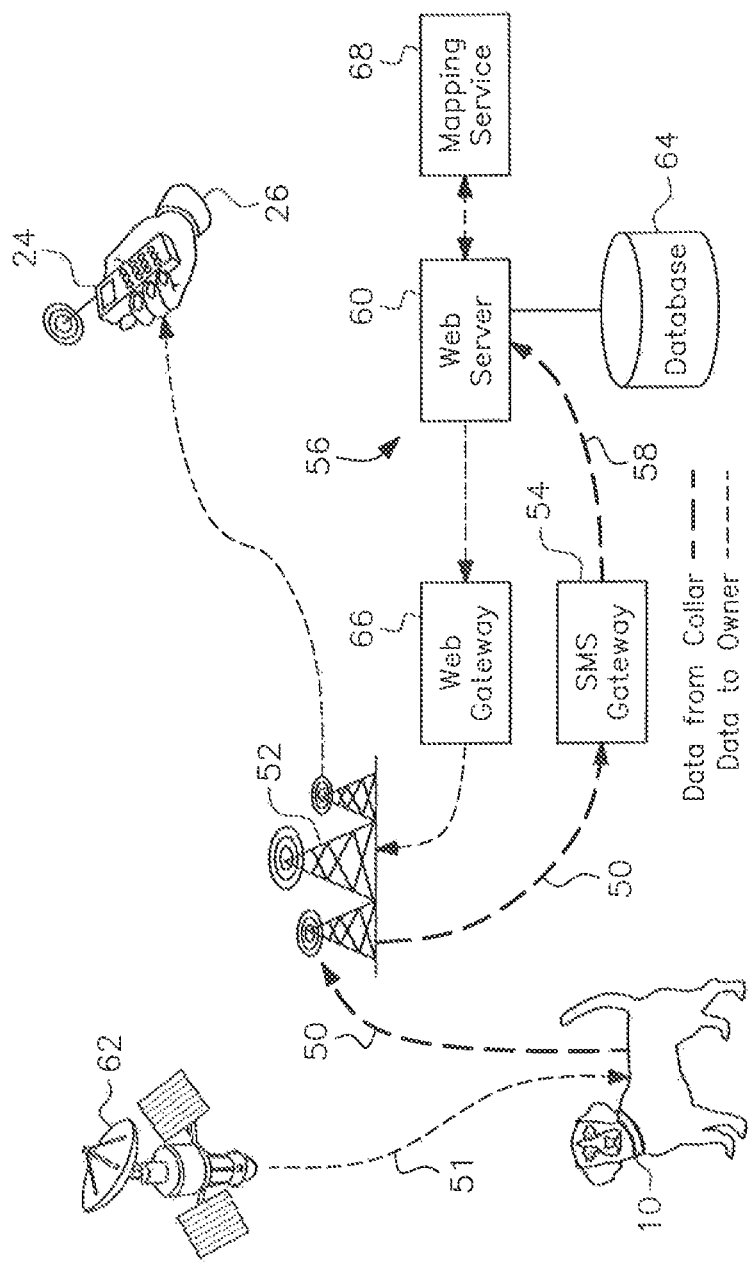
FIG. 6 shows the GPS tracking capability of the collar of the present invention as integrated with the cellular network and Internet infrastructure that supports locating and reporting of the dog's location using SMS messages and/or email to a smart device.
Figure 7:
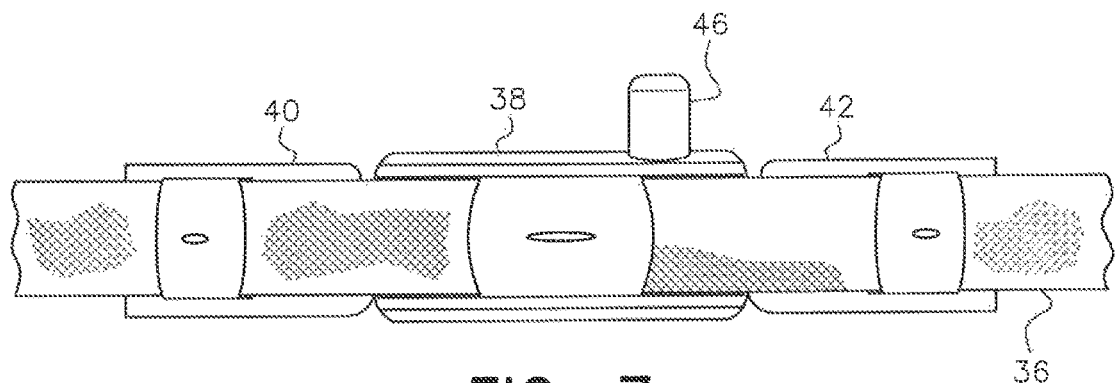
FIG. 7 is an assembled view of a collar according the present invention from the outer side.
Figure 8A:
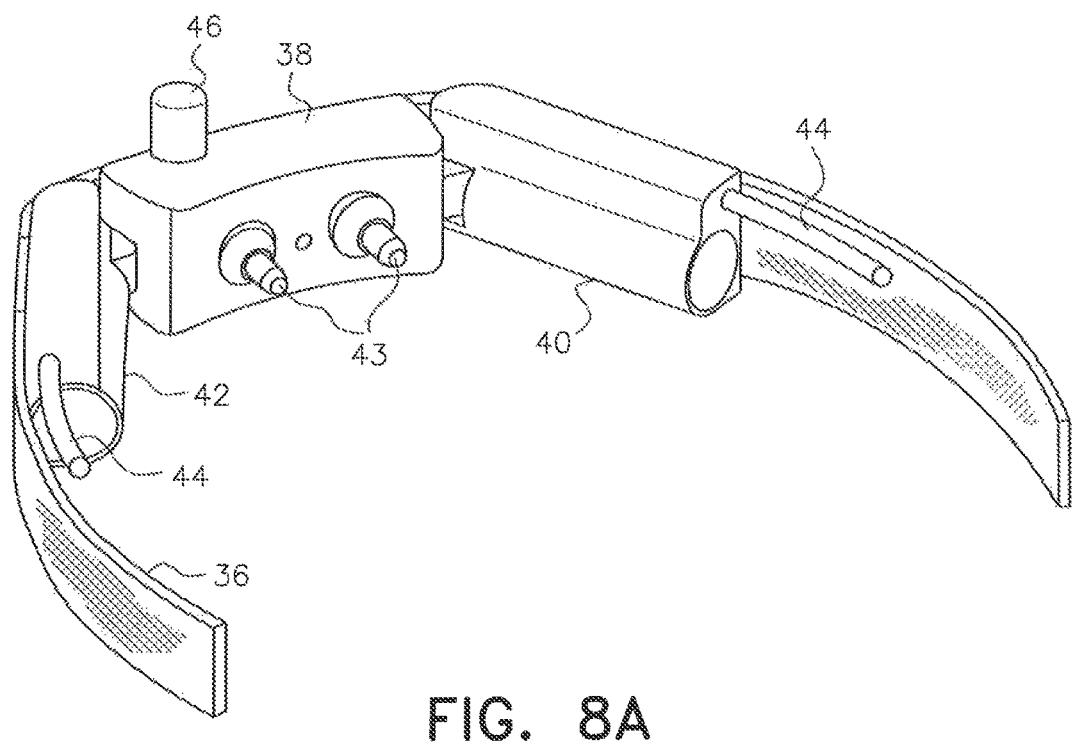
FIG. 8A is an inner perspective view of the assembled collar shown in FIG. 7.
Figure 8B:
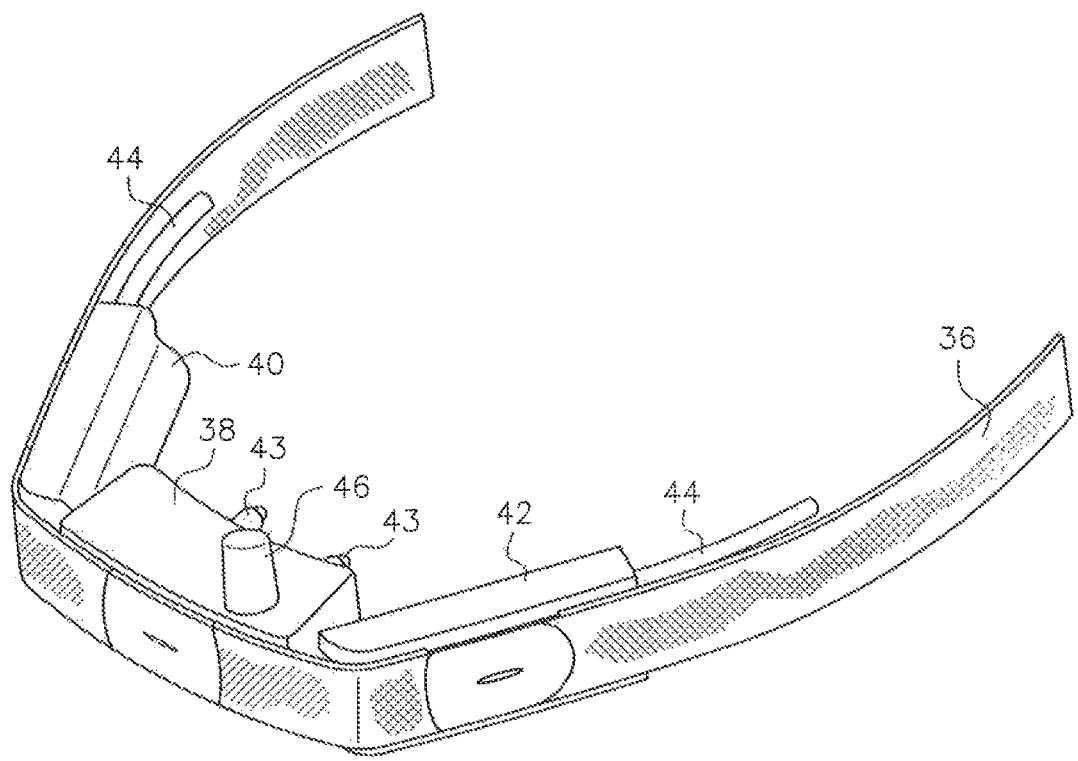
FIG. 8B is an outer perspective view of the assembled collar shown in FIGS. 7 and 8A.
Figure 9A:
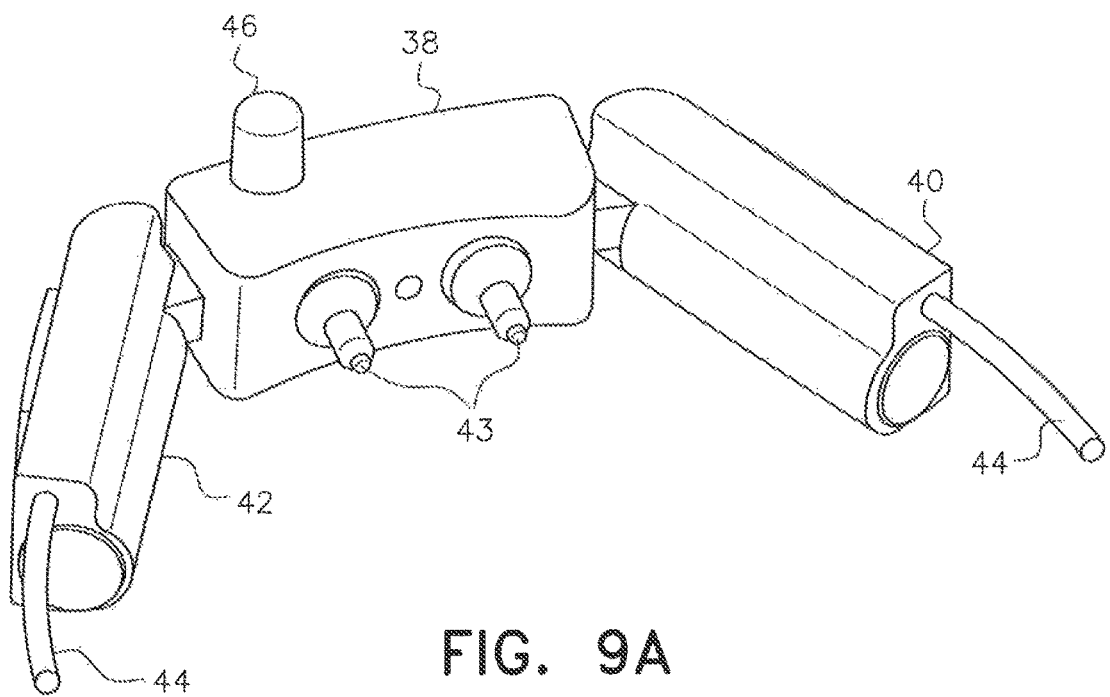
FIG. 9A is an inner perspective view of the collar components shown in FIGS. 7, 8A and 8B without the strap that is used to secure the collar around the dog's neck.
Figure 9B:
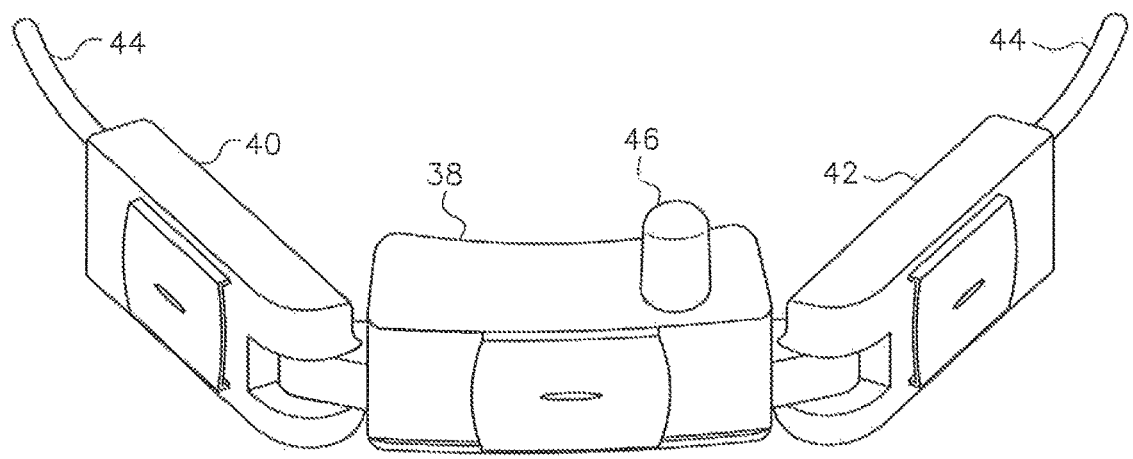
FIG. 9B is an outer perspective view of the collar components shown in FIG. 9A.

FIG. 6 depicts the infrastructure that supports the GPS dog tracking capability of the present invention. Upon activation, the GPS module 48 periodically transmits data on the dog's location using Short Message Service (SMS) massages. The SMS messages 50 from the dog collar 10 are relayed via a cell phone network 52 to a SMS gateway 54. The messages 50 include GPS coordinates 51 provided to the collar 10 by a GPS satellite 62. Once the SMS message 50 is on the cell phone network 52, the message is routed to the Internet 56 using the SMS gateway 54. A third party service provider is typically relied upon for the SMS gateway 54 because the gateway requires access to the cellular network 52.

The SMS gateway 54 converts the SMS message 50 to a HTTP request 58 and forwards it to the web server 60. The web server 60 receives HTTP requests containing GPS coordinates and other pertinent data from the collar 10. The data received from the collar is stored in a database 64 on the server and provided to the user 26 web gateway 66. Alternatively, SMS messages containing dog location status information may be received by the user directly from the collar, i.e., without going through the Internet, using the cellular network to transmit the signal.

When the user 26 logs onto the web server 60 to view the dog's location, the data held in the database 64 is retrieved. The web server 60 communicates with the user via SMS messages and/or email. According to one embodiment, a request is sent to a mapping service 68 such as Google, Bing, Yahoo and Mapquest, among others, to obtain an image that includes the dog's current location. This image is combined with a series of points to indicate the trail the dog has recently followed, along with status information and is displayed on the web browser of the owner's mobile device 24. Use of a mapping service 68 with images is not required, but is preferred for presentation clarity of the dog location information.

As is known in the art, SMS is a text messaging service component of phone, web and/or mobile communications systems, and uses standardized communications protocols to allow fixed line or mobile phone devices to exchange short text messages. The term "SMS" is used herein for both the user activity and all types of short text messaging in many parts of the world. Though most SMS messages are mobile-to-mobile text messages, support for the SMS message service has expanded to include other mobile technologies, with further expansion likely as new services are developed. Therefore, it is understood that the scope of the present invention is intended to include all current and future messaging technologies.

FIGS. 7-10 illustrate one version of the collar used within the apparatus and method of the present invention to provide both wireless fence containment and GPS location capabilities. As shown, the collar includes a strap 36, a control unit 38, two battery cases 40, 42 and antennas 44. Antennas 44 communicate with the transmitters 20 when the fence mode PCB 30 is active during wireless fence mode operation of the collar. Antenna 46 is part of the GPS module 48 as already described herein.

Accordingly, the present invention provides an integrated apparatus and method for containing and tracking a dog's location using a collar that provides two functionalities, the first enabling the user to locate the dog within the containment area of a wireless fence system, and the second allowing the user to find the dog using GPS technology should the dog escape the containment area.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A dog collar having a strap and a housing held by the strap comprising:
    a fence module configured to wirelessly communicate with at least one transmitter within a wireless fence dog containment system to determine a dog's position relative to a containment area defined by a wireless fence;
    a GPS module configured to wirelessly transmit dog location data from the collar to a first device to provide remote dog location tracking capability at the first device;
    wherein:
        the fence module is configured to be operationally active and the GPS module is configured to be inactive as long as the dog remains within the containment area so that the collar operates in a wireless fence mode;
        the fence module is further configured to power up the GPS module upon detecting that the dog is no longer in the containment area so that the collar operates in a GPS mode, wherein the powering up comprises the GPS module receiving at least one signal from the fence module;
        the GPS module is further configured, upon determining using information of the dog location data that the dog is beyond a set distance from the containment area, to send a "sleep request" signal to the fence module in response to which the fence module enters an inactive state while the collar is in the GPS mode; and the GPS module is further configured, upon determining using information of the dog location data that the dog is within a set distance from the containment area to send a "wake request" signal to the fence module, whereupon the fence module returns from the inactive state to an active state, whereupon the fence module re-establishes communication with the at least one transmitter within the wireless fence dog containment system and resumes operation in the wireless fence mode, wherein the fence module is configured to power down the GPS module upon returning to the active state.

2. The dog collar as set forth in claim 1, wherein the fence module includes a fence mode printed circuit board (PCB) and the GPS module includes a GPS mode PCB, the fence mode PCB and the GPS mode PCB both residing within the collar housing.

3. The dog collar as set forth in claim 2, wherein the fence mode PCB is powered by a fence mode battery, and the GPS mode PCB is powered by a GPS mode battery, the GPS mode battery being separate from said fence mode battery.

4. The dog collar as set forth in claim 1, wherein the first device is selected from the group consisting of a smart-phone, a tablet and a PC.

5. The dog collar as set forth in claim 4, wherein the dog location data is transmitted from the collar to the first device by SMS messages.

6. The dog collar as set forth in claim 4, wherein the dog location data is transmitted from the collar to the first device by e-mail.

7. The dog collar as set forth in claim 1, wherein the first device is a web server, the dog location data being stored at the web server and made accessible to a user having a smart-phone, tablet or PC to provide the user with the dog location data.

8. The dog collar as set forth in claim 7, wherein the dog location data is transmitted from the collar to the web server via a cellular network.

9. The dog collar as set forth in claim 8, wherein the web server is configured to access a mapping service to provide the user with a geographic depiction of a location of the dog based on the dog location data.

10. A method of tracking location of a dog both when the dog is within a containment area of a wireless dog fence system and when the dog has escaped from the containment area, comprising the steps of:

providing the dog with a collar having a fence module and GPS module, wherein the fence module is configured to wirelessly communicate with at least one transmitter within a wireless fence dog containment system to determine a dog's position relative to a containment area defined by a wireless fence, and the GPS module is configured to wirelessly transmit dog location data from the collar to a first device when the dog is outside the containment area;

activating and using the fence module as long as the dog remains within the containment area so that the collar operates in a wireless fence mode, wherein the GPS module resides in an inactive state when the collar is in the wireless fence mode;

activating the GPS module upon the fence module detecting that the dog is no longer in the containment area so that the collar switches from its wireless fence mode to a GPS mode;

wherein:
the GPS module, upon determining using information of the dog location data that the dog is beyond a set distance from the containment area, sends a "sleep request" signal to the fence module;
the fence module, in response to receiving a "sleep request" signal, enters into its inactive state while the collar is operating in the GPS mode;
the GPS module wirelessly transmits the dog location data, including GPS coordinates, from the collar to the first device in the GPS mode;

wherein:
the GPS module, upon determining using information of the dog location data that the dog has returned to within the set distance, sends a "wake request" signal to the fence module, whereupon in response to receiving the "wake request" signal the fence module switches from its inactive state to an active state, and
the collar resumes wireless fence mode operation upon re-establishment of communication between the fence module and the at least one transmitter within the wireless fence dog containment system.

11. The method as set forth in claim 10, wherein the dog location data is transmitted from the collar to the first device as a SMS message or an e-mail.

12. The method as set forth in claim 11, wherein the first device is a smart-phone, tablet or PC.

13. The method as set forth in claim 11, wherein the first device is a web server.

14. The method as set forth in claim 13, wherein the dog location data is transmitted from the collar to the web server via a cellular network.

15. The method as set forth in claim 14, wherein the cellular network relays SMS messages from the dog collar to a SMS gateway, said gateway converting each SMS message to a HTTP request and forwarding the HTTP request to the web server.

16. The method as set forth in claim 15, wherein the web server stores the dog location data and provides the dog location data to a user's smart-phone, tablet or PC as an SMS message upon request.

17. The method as set forth in claim 16, wherein web server further sends a request to a mapping service and receives an image of the dog's location, the image being included with the dog location data sent from the web server to the user.

18. The method as set forth in claim 10, wherein the fence module shuts down the GPS module when the collar resumes operations in its wireless fence mode.

19. The method as set forth in claim 10, wherein:
the step of activating the GPS module is initiated automatically by the collar to switch from the wireless fence mode to the GPS mode in response to a breach of the wireless fence indicating the collar is outside the containment area, and
the collar determines when to return to the wireless fence mode on the basis of dog location data received from the GPS module.

20. A dog collar having a strap and a housing held by the strap comprising:
a fence module configured to wirelessly communicate with at least one transmitter within a wireless fence dog containment system to determine a dog's position relative to a containment area defined by a wireless fence;

a GPS module configured to wirelessly transmit dog location data from the collar to a first device to provide remote dog location tracking capability at the first device;

wherein:

the fence module is configured to be operationally active and the GPS module is configured to be inactive as long as the dog remains within the containment area so that the collar operates in a wireless fence mode;

the fence module is further configured to power up the GPS module upon detecting that the dog is no longer in the containment area so that the collar operates in a GPS mode, wherein the powering up comprises the GPS module receiving at least one signal from the fence module;

the GPS module is further configured, upon determining using information of the dog location data that the dog is beyond a set distance from the containment area, to send a "sleep request" signal to the fence module in response to which the fence module enters an inactive state while the collar is in the GPS mode; and the GPS module is further configured, upon determining using information of the dog location data that the dog is within a set distance from the containment area to send a "wake request" signal to the fence module, whereupon the fence module returns from the inactive state to an active state, whereupon the fence module re-establishes communication with the at least one transmitter within the wireless fence dog containment system and resumes operation in the wireless fence mode, wherein the fence module is configured to power down the GPS module upon returning to the active state, wherein the powering down comprises the GPS module receiving at least one signal from the fence module.

21. A dog collar having a strap and a housing held by the strap comprising:

a fence module configured to wirelessly communicate with at least one transmitter within a wireless fence dog containment system to determine a dog's position relative to a containment area defined by a wireless fence;

a GPS module configured to wirelessly transmit dog location data from the collar to a first device to provide remote dog location tracking capability at the first device, wherein the fence module and the GPS module are directly communicatively connected within the housing, wherein the fence module comprises a first power source, wherein the GPS module comprises a second power source different than the first power source;

wherein:

the fence module is configured to be operationally active and the GPS module is configured to be inactive as long as the dog remains within the containment area so that the collar operates in a wireless fence mode;

the fence module is further configured to power up the GPS module upon detecting that the dog is no longer in the containment area so that the collar operates in a GPS mode, wherein the powering up comprises the GPS module receiving at least one signal from the fence module;

the GPS module is further configured, upon determining using information of the dog location data that the dog is beyond a set distance from the containment area, to send a "sleep request" signal to the fence module in response to which the fence module enters an inactive state while the collar is in the GPS mode; and the GPS module is further configured, upon determining using information of the dog location data that the dog is within a set distance from the containment area to send a "wake request" signal to the fence module, whereupon the fence module returns from the inactive state to an active state, whereupon the fence module re-establishes communication with the at least one transmitter within the wireless fence dog containment system and resumes operation in the wireless fence mode, wherein the fence module is configured to power down the GPS module upon returning to the active state.

* * * * *